United States Patent
Liu

(10) Patent No.: US 8,249,506 B2
(45) Date of Patent: Aug. 21, 2012

(54) MASTER-SLAVE MOBILE COMMUNICATION SYSTEM AND NETWORK DOMAIN LOGIN METHOD

(75) Inventor: Xiao-Wen Liu, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 292 days.

(21) Appl. No.: 12/622,926

(22) Filed: Nov. 20, 2009

(65) Prior Publication Data

US 2010/0130130 A1    May 27, 2010

(30) Foreign Application Priority Data

Nov. 21, 2008  (TW) ............................... 97145080 A

(51) Int. Cl.
*H04B 7/00* (2006.01)

(52) U.S. Cl. ....... 455/41.2; 455/419; 455/425; 709/217; 370/338

(58) Field of Classification Search .................. 455/41.2, 455/73, 74, 168.1, 179.1, 295, 303, 426.1, 455/426.2, 444, 450, 451, 464, 465, 556.1, 455/556.2; 370/338, 401; 348/14.01, 14.02
See application file for complete search history.

(56) References Cited

U.S. PATENT DOCUMENTS

| | | | |
|---|---|---|---|
| 7,167,678 B2 * | 1/2007 | Powers | 455/41.2 |
| 7,649,872 B2 * | 1/2010 | Naghian et al. | 370/338 |
| 7,675,537 B2 * | 3/2010 | Wilson et al. | 348/14.01 |
| 7,957,729 B2 * | 6/2011 | Roter et al. | 455/422.1 |
| 2008/0081611 A1 * | 4/2008 | Hoyt et al. | 455/425 |
| 2008/0125037 A1 * | 5/2008 | Ibrahim et al. | 455/41.2 |

* cited by examiner

*Primary Examiner* — Andrew Wendell
*Assistant Examiner* — Chung-Tien Yang
(74) *Attorney, Agent, or Firm* — Muncy, Geissler, Olds & Lowe, PLLC

(57) ABSTRACT

A master-slave mobile communication system includes a host device and an extension device. The host device includes a call module, a first BLUETOOTH® module and a first communication module. The extension device includes a second BLUETOOTH® module and a second communication module. The first and second communication modules log in to a first and a second network domain respectively. The first and second BLUETOOTH® modules provide an information channel between the host device and the extension device to transmit a data. The extension device informs the host device a login data of the second network domain. The host device communicates with a remote device through the first network domain or the information channel and the second network domain that the extension device logs into. Therefore, in a specific range, the host device uses functions of the extension device and a BLUETOOTH® technology to log in to two network domains.

16 Claims, 5 Drawing Sheets

MASTER-SLAVE MOBILE COMMUNICATION SYSTEM AND NETWORK DOMAIN LOGIN METHOD

CLAIM FOR PRIORITY

This application claims the benefit of Taiwan Patent Application No. 097145080, filed on Nov. 21, 2008, which is hereby incorporated by reference for all purposes as if fully set forth.

BACKGROUND OF THE INVENTION

1. Field of Invention

The present invention relates to a BLUETOOTH® mobile communication system, and more particularly to a master-slave BLUETOOTH® mobile communication system and a network domain login method, by which two network domains can be logged into.

2. Related Art

In an early day, a band-held device can only provide for logging in to a single network domain, wherein a subscriber selects their appropriate network domain from different telecommunication vendors, according to his or her requirement. However, if subscribers have to make lots of calls or need a long time interaction and communication with a remote device of other network domain, cost will be quite expensive. In addition, more and more subscribers own two or more network domain accounts, and for each account, the user requires to purchase a cellular phone to put an identification module built-in with the network domain account therein; hence, the subscriber will need to carry plural cellular phones for a possible need. Moreover, the electromagnetic waves produced by the cellular phones are very strong and can affect people's health significantly, such that cellular phone vendors brought up a dual mode cellular phone, allowing a subscriber to use two network domain accounts in one cellular phone, thereby reducing the amount of electromagnetic waves.

Yet, the prior art is still provided with unavoidable shortcomings as described below.

First of all, the dual mode cellular phone refers to a cellular phone which is equipped with two different communication modes to log in to two identical or different network domains. However, the communication modes configured in the dual mode cellular phone are fixed and unchangeable. Therefore, for a subscriber who owns plural network domain accounts, he or she cannot change freely the network domain account for use according to his/her preference; it is still inconvenient in application.

Secondly, the dual mode cellular phone is built in with two different communication modes to log in to different network domains. When each communication mode activates a telecommunication connection, a quite amount of electromagnetic waves will be emanated. Thus, the amount of electromagnetic waves produced by the dual-module cellular phone will be about a total sum of the amount of electromagnetic waves from all the communication modes. Comparing to a single mode cellular phone, the dual mode cellular phone affects and harms people's health more severely.

SUMMARY OF THE INVENTION

Accordingly, the object of the present invention is to provide a BLUETOOTH® mobile communication system which can reduce the electromagnetic waves that affect human bodies and can replace freely a network domain login account.

To solve the aforementioned issues, a technical means provided by the present invention discloses a master-slave BLUETOOTH® mobile communication system which includes a host device and an extension device.

The host device includes a call module, a first BLUETOOTH® module and a first communication module. The call module is used for receiving or transmitting at least one signal. The first communication module is used for logging in to a first network domain, and for enabling a primary telecommunication channel to be set up between the first communication module and a remote device through the first network domain. The primary telecommunication channel is used for transmitting the signal between the host device and the remote device.

The extension device includes a second BLUETOOTH® module and a second communication module. The second communication module is used for logging in to a second network domain, and the first BLUETOOTH® module is used for detecting and connecting to the second BLUETOOTH® module to form an information channel, wherein the host device directs the extension device to enable, through the second communication module and the second network domain. A secondary telecommunication channel is to be set up for connecting to the remote device, and the secondary telecommunication channel and the information channel are used for transmitting the signal between the host device and the remote device.

To solve the aforementioned method issue, a technical means provided by the present invention discloses a network domain login method applied to a host device capable of communicating with an extension device by a BLUETOOTH® standard. The host device includes a first BLUETOOTH® module and a first communication module which is used for logging in to a first network domain, and extension device includes a second BLUETOOTH® module and a second communication module. The network domain login method comprises the step of detecting the second BLUETOOTH® module of the extension device by the first BLUETOOTH® module of the host device, the step of setting up an information channel between the first BLUETOOTH® module and the second BLUETOOTH® module when the second BLUETOOTH® module is detected, the step of accessing configuration data of the second communication module of the extension device through the information channel, and the step of the host device directing, according to the configuration data, the second communication module to log in to a second network domain and to access a packet from the second network domain.

The present invention is provided with at least the following effects.

First of all, by the master-slave BLUETOOTH® mobile communication system, the subscriber only needs to carry the host device to stand by at two network domains within an effective connection range between the host device and the extension device.

Secondly, the electromagnetic waves produced by the connection of BLUETOOTH® modules are very weak, such that the amount of electromagnetic waves can be ignored. In addition, the host device itself is just a single mode cellular phone; therefore, with the extension device far away from the subscriber, the electromagnetic waves that affect the human bodies are much weaker than the electromagnetic waves produced by the dual-module hand-held device.

Thirdly, the extension device can be replaced at any time. If the subscriber owns plural network domain accounts, the most frequently-used network domain account can be configured on the host device and the less frequently-used network domain accounts can be configured on the extension device, such that the subscriber is easy to replace a network domain account in the host device or in the extension device as desired, so as to achieve an effect of dual-network domain stand-by, thereby improving applicability of the hand-held device.

To enable a further understanding of the objectives and the technological methods of the invention herein, the brief description of the drawings below is followed by the detailed description of the preferred embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
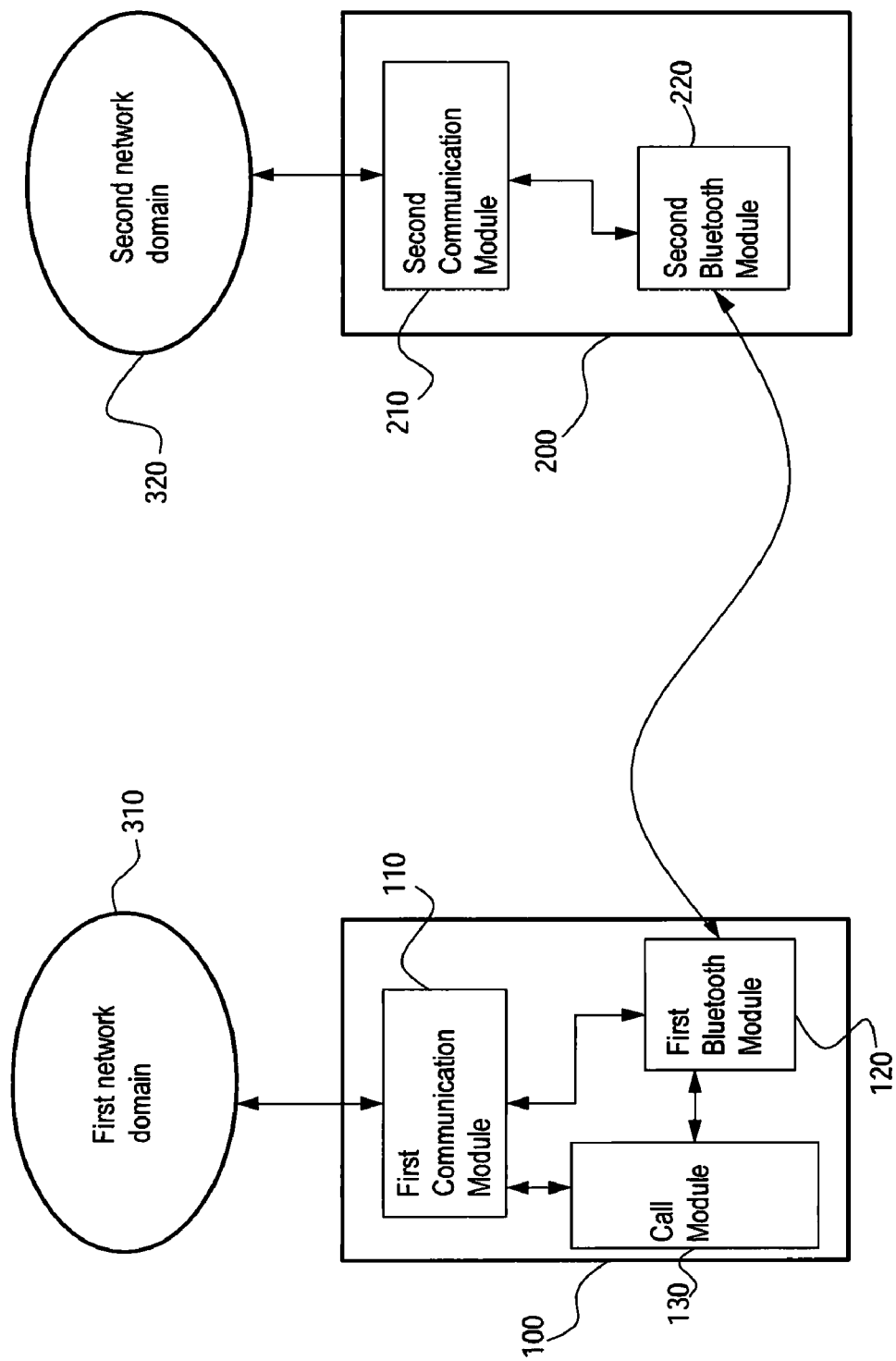
FIG. 1 shows a diagram of a master-slave BLUETOOTH® mobile communication system of an embodiment of the present invention.

Referring to FIG. 1, it shows a diagram of a master-slave BLUETOOTH® mobile communication system of an embodiment of the present invention. The master-slave BLUETOOTH® mobile communication system includes a host device 100 and an extension device 200.

The host device 100 includes a call module 130, a first BLUETOOTH® module 120 and a first communication module 110. The extension device 200 includes a second BLUETOOTH® module 220 and a second communication module 210. The call module 130 can receive and transmit at least one signal. The first communication module 110 can log in to a first network domain 310 and the second communication module 210 can log in to a second network domain 320. The first BLUETOOTH® module 120 detects and connects to the second BLUETOOTH® module 220 to form an information channel (not shown). The host device 100 directs the extension device 200 to provide a login state of the second network domain 320 through the information channel. Besides, the host device 100 receives the login state of the second network domain 320 and exchange information with the extension device 200.

The host device 100 uses the first communication module 110 to set up a primary telecommunication channel (not shown) between the communication module 110 and a remote device (not shown) through the first network domain 310, or through the information channel, the host device 100 requests the extension device 200 to use the second communication module 210 to set up a secondary telecommunication channel with the remote device through the second network domain 320. The aforementioned signal can be transmitted between the host device 100 and the remote device through the primary telecommunication channel or can be transmitted between the host device 100 and the information channel through the secondary telecommunication channel.

The first communication module 110 and the second communication module 210 are configured respectively with an identification module, allowing the first communication module 110 and the second communication module 210 to log in to the first network domain 310 and the second network domain 320, respectively. This identification module can be a SIM (Subscriber Identity Module) card, a UIM (User Identity Module) card or a PHS (Personal Handyphone System, a low-power cellular phone system) module, etc. Whereas, the first network domain 310 and the second network domain 320 can be a GSM (Global System for Mobile) network domain, a CDMA (Code Division Multiple Access) network domain, a PHS network domain, a WCDMA (Wideband CDMA) network domain or a TD-SCDMA (Time Division—Synchronous CDMA) network domain. The first network domain 310 and the second network domain 320 can be identical or different.

After the information channel is set up, the extension device 200 transmits periodically configuration data of the second communication module 210 through the information channel to the host device 100. Besides, a format of the configuration data corresponds with a profile defined according to L2CAP (Logical Link Control and Adaptation Protocol), which records primarily a type of the identification module of the second communication module 210 and the login state of the second communication module 210. Generally, the file is called BLUETOOTH® Phone Profile, BPhone Profile or BLUETOOTH® Profile.

On the other hand, the call module 130 includes a microphone, a speaker, a keyboard or a screen. The microphone can be used for inputting voices of a subscriber. The speaker can be used for playing voices transmitted by the remote device. The keyboard can be used for dialing or controlling an operation of the extension device 200. The screen can be used for displaying a related information, such as whether a BLUETOOTH® connection is successful, whether a dial is successful, a caller identity or short messages transmitted by both parties, etc. Furthermore, the call module 130 can further include a camera to transmit images of at least one party. As a result, the signal represents something selected from a group consisting of texts, voices and images.

Figure 2A:
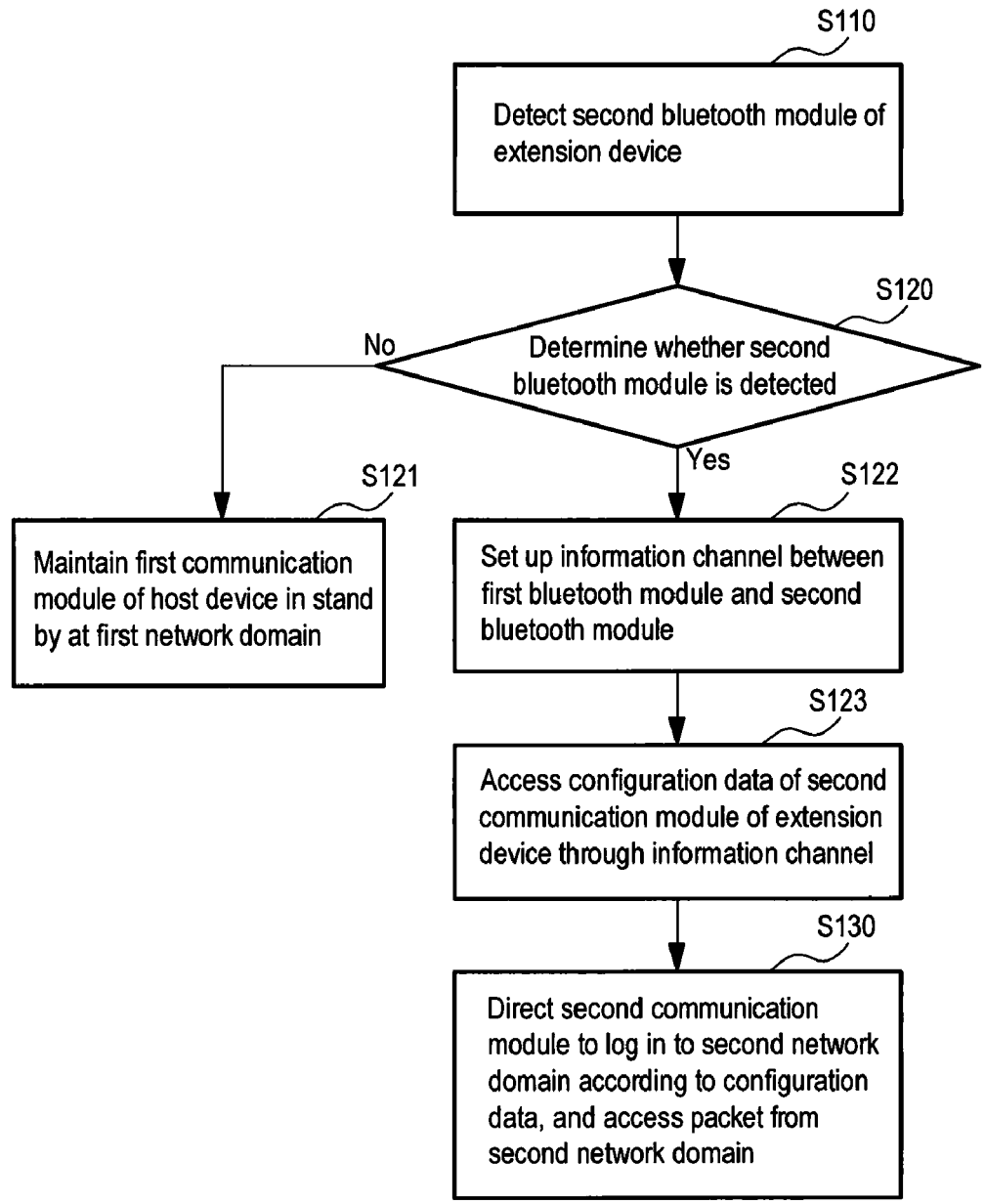
FIG. 2A shows a flow chart of a network domain login method of an embodiment of the present invention.

Referring to FIG. 2A, it shows a flow chart of a network domain login method of an embodiment of the present invention, with reference to FIG. 1 at the same time to help understanding. This network domain login method can be applied to the host device 100 which is capable to communicate with the extension device 200 by a BLUETOOTH® standard. The host device 100 is provided with the first communication module 110 to log in to the first network domain 310 independently and the host device 100 can log in to the second network domain 320 through the extension device 200. This network domain login method comprises following steps.

The first BLUETOOTH® module 120 of the host device 100 detects the second BLUETOOTH® module 220 of an extension device 200 (step S110) and then determines whether the second BLUETOOTH® module 220 is detected (step S120). These steps are primarily to allow the host device 100 to determine whether the extension device 200 exists within a detection range to log in to the second network domain 320.

If the first BLUETOOTH® module 120 does not detect the second BLUETOOTH® module 220, the first communication module 110 of the host device 100 is maintained in stand by at the first network domain 310 (step S121). This first communication module 110 is built into or inserted with an identification module, and the identification module allows the host device 100 to log in to and stand by in the first network domain 310. The first network domain 310 can be a GSM network domain, a CDMA network domain, a PHS network domain, a WCDMA network domain or a TD-SCDMA network domain.

When the first BLUETOOTH® module 120 detects a second BLUETOOTH® module 220, an information channel between the first BLUETOOTH® module 120 and the second BLUETOOTH® module 220 is set up (step S122). This information channel provides for the host device 100 to transmit a command to control the extension device 200, exchanges information between the host device 100 and the extension device 200 and transmits signals.

After the information channel is set up, the host device 100 will access the configuration data of the second communication module 210 of the extension device 200 through the information channel (step S123).

Finally, the host device 100 directs the second communication module 210 to log in to the second network domain 320 according to the configuration data, and accesses a packet from the second network domain 320 (step S130). The format of the configuration data is described above, i.e., the profile (BPhone Profile) defined by L2CAP, which is used to record the type of identification module configured in the second communication module 210, the login state of the second communication module 210 and service functions provided by the extension device 200. The host device 100 has to access the configuration data in order to obtain equipment features and functions of the extension device 200, such that a related control command can be transmitted through the information channel to the extension device 200 to activate the second communication module 210 to log in to the second network domain 320. Accordingly, the host device 100 combines with the extension device 200 to form a dual-network domain stand-by operation system.

Figure 2B:
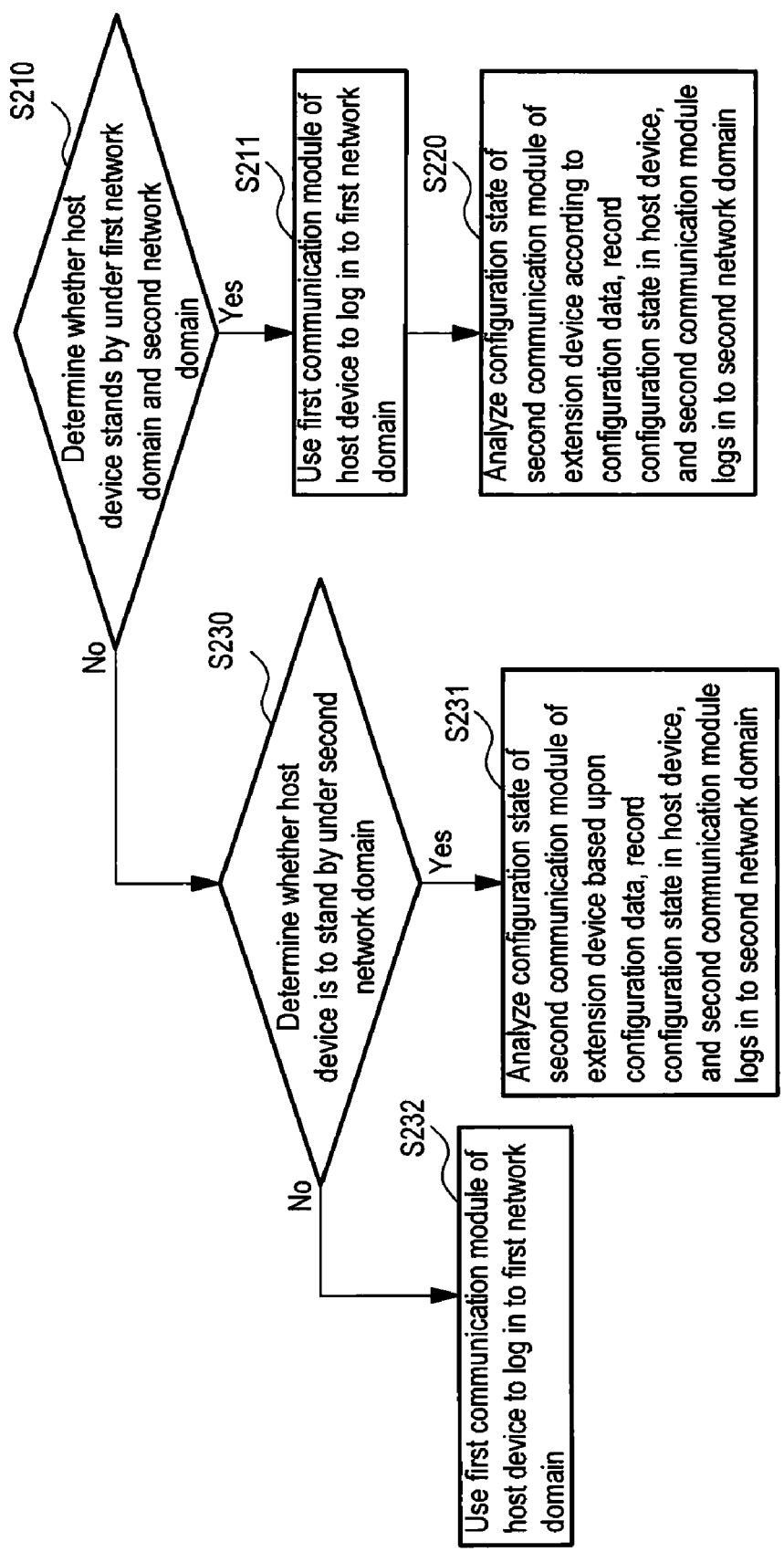
FIG. 2B shows a flow chart of standing by under a first network domain and a second network domain simultaneously according to an embodiment of the present invention.

On the other hand, as shown in FIG. 2B, it shows a flow chart of standing by under a first network domain and a second network domain simultaneously, according to an embodiment of the present invention. The host device 100 can simultaneously stand by under two network domains (i.e. the first network domain 310 and the second network domain 320 in this embodiment) with the extension device 200. Moreover, the host device 100 can stand by under one single network domain. The flow is described below.

Whether the host device 100 stands by under the first network domain 310 and the second network domain 320 simultaneously is determined. (step S210). It is determined, for example, according to a control command inputted by the subscriber.

If the host device 100 is determined as standing by under the first network domain 310 and the second network domain 320 simultaneously, the first communication module 110 of the host device 100 is used to log in to the first network domain 310 (step S211). Next, a configuration state of the second communication module 210 of the extension device 200 is analyzed according to the configuration data, the configuration state is recorded in the host device 100, and the second communication module 210 logs in to the second network domain 320 (step S220). In these steps, the host device 100 and the extension device 200 log in to the first network domain 310 and the second network domain 320 through the first communication module 110 and the second communication module 210 respectively, followed by allowing the host device 100 to connect to the extension device 200 by BLUETOOTH® technology and to communicate with the remote device through the extension device 200.

If the host device 100 is determined as not standing by under the first network domain 310 and the second network domain 320 simultaneously, it is determined whether the host device 100 is to stand by under the second network domain (step S230). In one embodiment, a factor that the subscriber does not use the host device 100 to log in to the first network domain 310 is taken into consideration. Therefore, in the following description, the host device 100 will select one network domain to stand by based upon the setting inputted by the subscriber.

If the host device 100 is determined as standing by under the second network domain 320, the configuration state of the second communication module 210 of the extension device 200 is analyzed based upon the configuration data, the configuration state is recorded in the host device 100, and the second communication module 210 logs in to the second network domain 320 (step S231). The configuration data and the login of the second communication module 210 are described above, which will not be addressed further.

If the host device 100 is determined as not standing by under the second network domain 320 (that is, the host device 100 is determined as standing by under the first network domain 310), the first communication module 110 of the host device 100 is used to log in to the first network domain 310 (step S232). This means that the subscriber configures and controls the host device 100 to log in to the first network domain 310 and does not activate or stop the first BLUETOOTH® module 120.

The method of logging in to the second network domain 320 by the aforementioned extension device 200 is described below.

First of all, after determining that the information channel is set up, the extension device 200 automatically uses the second communication module 210 to log in to the second network domain 320, or the host device 100 requests the extension device 200 to log in to the second network domain 320. Finally, the extension device 200 reports a message back to the host device 100 that the second network domain 320 has been logged into.

Secondly, after activating the extension device 200, the extension device 200 automatically uses the second communication module 210 to log in to the second network domain 320 and reports the second network domain 320 which is logged into now and the login state back to the host device 100 after the information channel is set up.

Besides, after the information channel is set up, the extension device 200 periodically reports the configuration data of the second communication module 210 back to the host device 100 through the information channel. Whereas, the second network domain 320 can be a GSM network domain, a CDMA network domain, a PHS network domain, a WCDMA network domain or a TD-SCDMA network domain, but is different from the first network domain 310.

Figure 3:
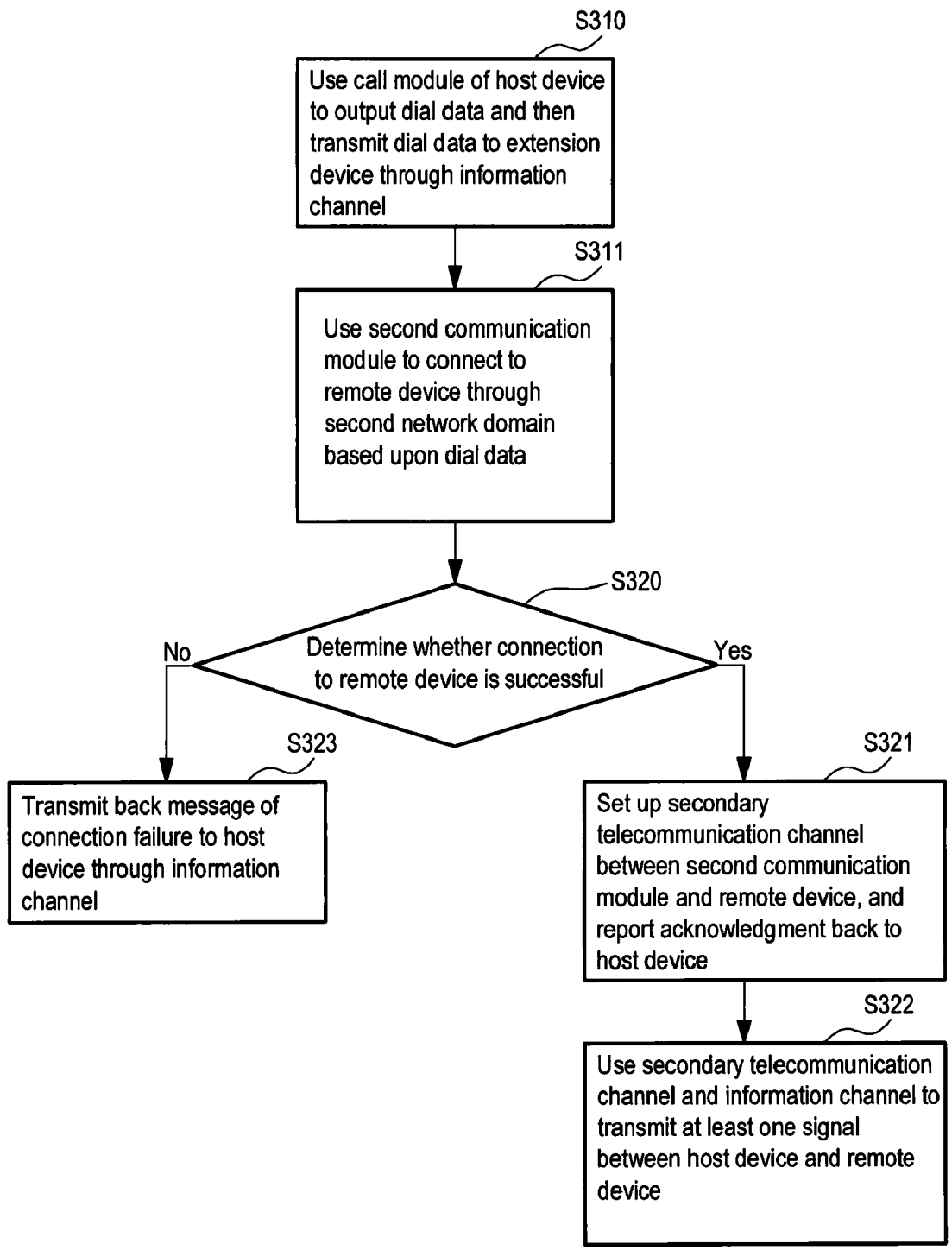
FIG. 3 shows a flow chart of using an extension device to make a call according to an embodiment of the present invention.

Referring to FIG. 3, it shows a flow chart of using the extension device 200 to make a call according to the present invention, with reference to FIG. 1 as well to help understanding. Making a call is based on the conditions that the host device 100 has connected to the extension device 200 and the extension device 200 has already logged into the second network domain 320. In general, the subscriber can use the call module 130 of the host device 100 to dial, and then the host device 100 uses the first communication module 110 to connect to the remote device through the first network domain 310 based upon a content of the dial, thereby forming a primary telecommunication channel through which the signal is transmitted between the host device 100 and the remote device. However, the host device 100 can connect to the remote device through the extension device 200 by following steps.

The call module 130 of the host device 100 is used to output dial data and then transmit the dial data to the extension device 200 through the information channel (step S310). Next, the extension device 200 uses the second communication module 210 to connect to the remote device through the second network domain 320 based upon the dial data (step S311). This dial data includes a dialing command and a telecommunication number of the remote device. The dialing command is for the host device 100 to control the extension device 200.

Whether the connection to the remote device is successful is determined (step S320). If the remote device is determined as being connected successfully, a secondary telecommunication channel is set up between the second communication module 210 and the remote device, and an acknowledgment is reported back to the host device 100 (step S321). The acknowledgment is sent out from the extension device 200, thereby informing the host device 100 that the dial data has been executed correctly. The secondary telecommunication channel set up between the extension device 200 and the remote device is different from the primary telecommunication channel. The host device 100 can carry out a call with the remote device through the extension device 200.

After that, the secondary telecommunication channel and the information channel can be used to transmit at least one signal between the host device 100 and the remote device (step S322). Whereas, the signal is generated when the host device 100 uses the call module 130 to interact and communicate with the remote device. The call module 130, as described above, includes a microphone, a speaker, a keyboard, a screen or a camera. However, the signal represents something selected from texts, voices and images.

If the remote device is determined as not being connected successfully, the extension device 200 will transmit back a message of connection failure to the host device 100 through the information channel (step S323) Therefore, the cause of the extension device 200 failure on connecting with the host device 100 is informed. The cause is, for example, that the called party is powered off, the number dialed is unavailable or the remote device has canceled the connection, etc.

Figure 4:
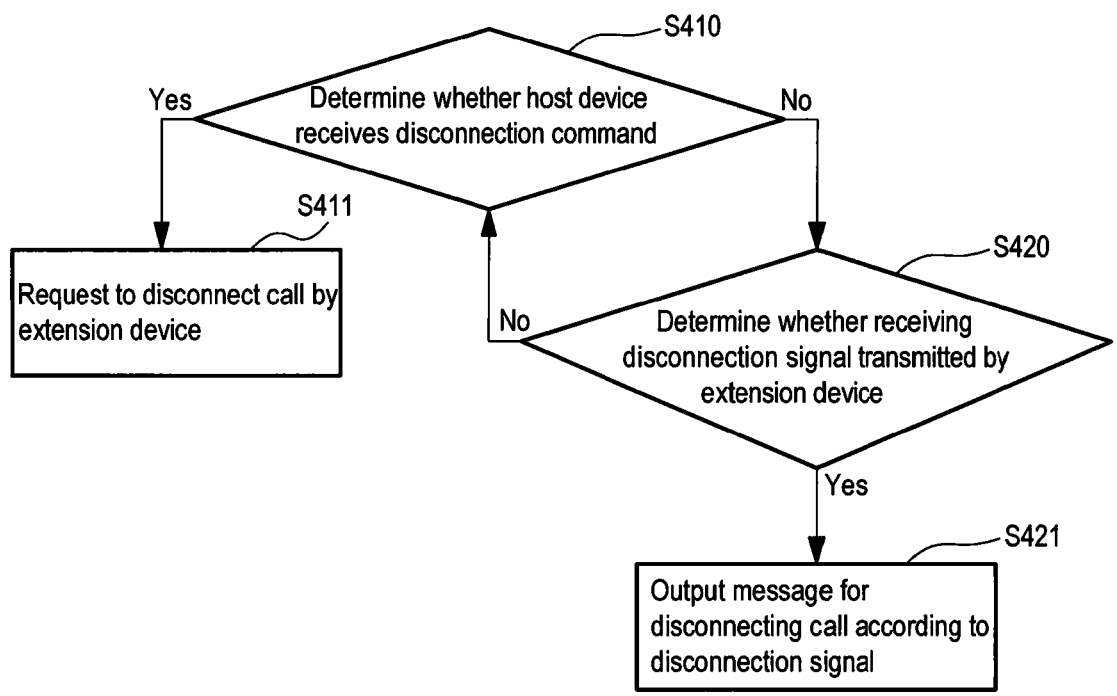
FIG. 4 shows a flow chart of determining a call connection according to an embodiment of the present invention.

Referring to FIG. 4, it shows a flow chart of determining a call connection, according to an embodiment of the present invention. Herein only a flow that the host device 100 carries out a call connection with the remote device through the extension device 200 is described. The flow includes following steps.

Whether the host device 100 receives a disconnection command is determined (step S410). This step is primarily to determine whether the subscriber actively disconnects the call.

If the disconnection command is determined as being received, then the extension device 200 is requested to disconnect the call (step S411). In this step, the host device 100 outputs the disconnection command to the extension device 200 through the information channel, so as to request the extension device 200 to cut off the connection with the remote device.

If the disconnection command is determined as being not received, then it means that the subscriber does not actively disconnect the call. At this time, whether a disconnection signal transmitted by the extension device 200 is received is determined (step S420), so as to determine whether the remote device disconnects the extension device 200:

If the disconnection signal transmitted by the extension device 200 is determined as being not received, then it means that the host device 100 still keeps linking up with the remote device through the extension device 200 and then step S410 is proceeded.

If the disconnection signal transmitted by the extension device 200 is determined as being received, then it means that the remote device actively disconnects and the host device 100 will output a message for disconnecting the call according to the disconnection signal (step S421) to terminate the link between both parties.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A master-slave mobile communication system, comprising:
   a host device including a call module, a first BLUETOOTH® module and a first communication module, the call module for receiving or transmitting at least one signal, the first communication module for logging in to a first network domain, and for enabling a primary telecommunication channel to be set up between the first communication module and a remote device through the first network domain, and the primary telecommunication channel for transmitting the signal between the host device and the remote device; and
   an extension device including a second BLUETOOTH® module and a second communication module, the second communication module for logging in to a second network domain, and the first BLUETOOTH® module for detecting and connecting to the second BLUETOOTH® module to form an information channel, wherein
   the host device directs the extension device to enable, through the second communication module and the second network domain, a secondary telecommunication channel to be set up for connecting to the remote device, and the secondary telecommunication channel and the information channel are for transmitting the signal between the host device and the remote device; and the host device determines whether to stand by under the first network domain and the second network domain simultaneously or not, if the host determines not to stand by under the first network domain and the second network domain simultaneously, determines whether to stand by under the second network domain or not, and if the host device determines to stand by under the second network domain, analyzing a configuration state of the second communication module of the extension device based upon the configuration data, recording the configuration state in the host device, and the second communication module logging in to the second network domain.

2. The master-slave mobile communication system according to claim 1, wherein the first network domain is a GSM network domain, a CDMA network domain, a PHS network domain, a WCDMA network domain or a TD-SCDMA network domain.

3. The master-slave mobile communication system according to claim 1, wherein the second network domain is a GSM network domain, a CDMA network domain, a PHS network domain, a WCDMA network domain or a TD-SCDMA network domain.

4. The master-slave mobile communication system according to claim 1, wherein the call module includes a microphone, a speaker, a keyboard or a screen.

5. The master-slave mobile communication system according to claim 4, wherein the call module further includes a camera.

6. The master-slave mobile communication system according to claim 1, wherein the signal represents something selected from a group consisting of texts, voices and images.

7. The master-slave mobile communication system according to claim 1, wherein after the information channel is set up, the extension device transmits periodically configuration data of the second communication module through the information channel to the host device.

8. The master-slave mobile communication system according to claim 7, wherein a format of the configuration data corresponds with a profile defined according to Logical Link Control and Adaption Protocol.

9. The master-slave mobile communication system according to claim 7, wherein the second communication module is configured with an identification module for allowing the second communication module to log in to the second network domain, and the configuration data record a type of the identification module and a login state of the second communication module.

10. A network domain login method applied to a host device capable of communicating with an extension device by a BLUETOOTH® standard, wherein the host device includes a first BLUETOOTH® module and a first communication module which is used for logging in to a first network domain, the extension device includes a second BLUETOOTH® module and a second communication module, and the network domain login method comprises:
    detecting the second BLUETOOTH® module of the extension device by the first BLUETOOTH® module of the host device;
    when the second BLUETOOTH® module is detected, setting up an information channel between the first BLUETOOTH® module and the second BLUETOOTH® module;
    accessing configuration data of the second communication module of the extension device through the information channel;
    the host device directing, according to the configuration data, the second communication module to log in to a second network domain and to access a packet from the second network domain; and
    determining whether the host device is to stand by under the first network domain and the second network domain simultaneously;
    if it's determined that the host device is not to stand by under the first network domain and the second network domain simultaneously, determining whether the host device is to stand by under the second network domain; and
    if it's determined that the host device is to stand by under the second network domain, analyzing a configuration state of the second communication module of the extension device based upon the configuration data recording the configuration state in the host device, and the second communication module logging in to the second network domain.

11. The network domain login method according to claim 10, wherein a format of the configuration data corresponds with a profile defined according to Logical Link Control and Adaptation Protocol.

12. The network domain login method according to claim 11, wherein the second communication module is configured with an identification module for allowing the second communication module to log in to the second network domain, and the configuration data record a type of the identification module and a login state of the second communication module.

13. The network domain login method according to claim 10 further comprising:
    using the host device to output dial data and then transmitting the dial data to the extension device through the information channel;
    using the second communication module to connect to a remote device, based upon the dial data, through the second network domain;
    determining whether the connection to the remote device is successful; and
    if it's determined that the connection to the remote device is successful, setting up a telecommunication channel between the second communication module and the remote device, reporting back to the host device that the telecommunication channel is set up, and using the telecommunication channel and the information channel to transmit at least one signal between the host device and the remote device.

14. The network domain login method according to claim 13, further comprising reporting back to the host device, through the information channel, on connection failure, if it's determined that the connection to the remote device is not successful.

15. The network domain login method according to claim 13, further comprising:
    determining whether the host device receives a disconnection command;
    if it's determined that the disconnection command is received, requesting the extension device to disconnect a call; and
    if it's determined that the disconnection command is not received, determining whether a disconnection signal transmitted by the extension device is received.

16. The network domain login method according to claim 15, further comprising:
    if it's determined that the disconnection signal is received, outputting a message for disconnecting the call according to the disconnection signal; and
    if it's determined that the disconnection signal is not received, proceeding to the step of determining whether the host device receives the disconnection command.

* * * * *